United States Patent [19]

McElreath et al.

[11] Patent Number: 4,527,242

[45] Date of Patent: Jul. 2, 1985

[54] AUTOMATIC FLIGHT CONTROL PILOT ASSIST SYSTEM

[75] Inventors: Kenneth W. McElreath; Gordon R. Fabian, both of Cedar Rapids, Iowa

[73] Assignee: Rockwell International Corporation, El Segundo, Calif.

[21] Appl. No.: 392,917

[22] Filed: Jun. 28, 1982

[51] Int. Cl.³ .................. B64C 13/00; G05D 1/08
[52] U.S. Cl. ..................... 364/434; 244/196; 244/17.13; 364/432
[58] Field of Search .............. 364/432, 428, 433, 434, 364/440; 244/76 R, 184, 196, 197, 180, 182, 177, 194, 17.13, 223; 73/178 R

[56] References Cited

U.S. PATENT DOCUMENTS

| | | | |
|---|---|---|---|
| 3,462,662 | 8/1969 | Carpenter | 364/432 |
| 3,528,633 | 9/1970 | Knemeyer | 244/17.13 |
| 3,807,666 | 4/1974 | Devlin | 244/196 |
| 3,920,966 | 11/1975 | Knemeyer et al. | 244/17.13 |
| 3,934,124 | 1/1976 | Gabriel | 364/432 |
| 4,017,823 | 4/1977 | Cooke et al. | 364/432 |
| 4,082,238 | 4/1978 | Fabian et al. | 244/194 |
| 4,094,479 | 6/1978 | Kennedy, Jr. | 244/184 |
| 4,109,886 | 8/1978 | Tribken et al. | 244/196 |
| 4,206,891 | 6/1980 | Perez et al. | 244/196 |
| 4,236,685 | 12/1980 | Kissel | 364/433 |

OTHER PUBLICATIONS

S. Boinodiris, Rudder Control for Ships, 5/76, pp. 3907–3908; IBM Tech. Disc. Bull., vol. 18, No. 12.

*Primary Examiner*—Felix D. Gruber
*Assistant Examiner*—Thomas G. Black
*Attorney, Agent, or Firm*—Terry M. Blackwood; George A. Montanye; H. Fredrick Hamann

[57] ABSTRACT

Automatic flight control apparatus, preferably for use in a helicopter, comprises a parallel connected servosystem which allows the apparatus to discern manual input forces and to respond naturally to them. The manual forces are sensed internal the parallel servosystem by monitoring the corrective error drive signal to the parallel servomotor. A signal indicative of excess manual force is used to develop other signals, one of which aids in temporarily defeating the command signal generated by the autopilot in trying to do its job, and another of which temporarily contributes positive feedback within the parallel servosystem so as to cause the servomotor to aid the pilot's manual input force. Another preferred embodiment includes a series connected servosystem.

20 Claims, 3 Drawing Figures

AUTOMATIC FLIGHT CONTROL PILOT ASSIST SYSTEM

This invention relates to flight control systems for aircraft and in the preferred embodiments to flight control systems for helicopter type aircraft. More particularly, the preferred embodiments relate to helicopter flight control systems having autopilot controlled servo actuators which operate flight control surfaces in parallel with manually operable devices such as pedals or control sticks or the like.

Autopilot commanded parallel connected servos are shown in the helicopter flight control art. Some systems use separate force sensors to distinguish pilot forces. Some systems use a manually activated release clutch. See for example U.S. Pat. Nos. 4,082,238, 3,920,966, and 3,528,633.

In accordance with the present invention, there is featured a parallel servo automatic flight control system which allows the system to discern manual control forces applied by the pilot and to respond naturally to them. These and other features, objects, and advantages of the invention will become more apparent upon reference to the following specification, claims, and appended drawings in which:

Figure 1:
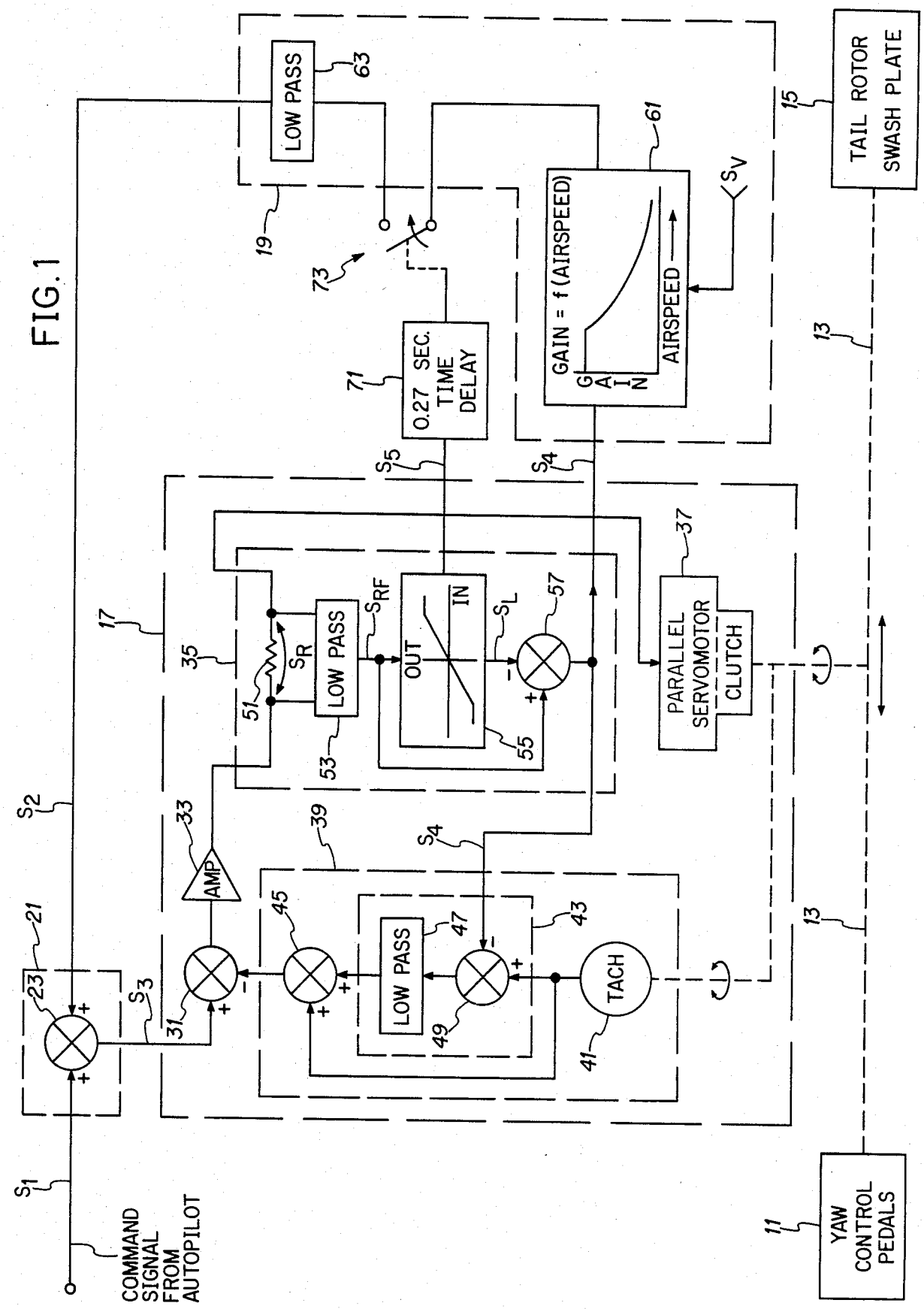
FIG. 1 is a block diagram schematic representing one presently preferred inventive embodiment.

Turning now to FIG. 1, therein is represented in simplified fashion a yaw control system for a helicopter. Pilot moveable pedals 11 are coupled through a mechanical linkage system 13 (represented by dashed lines) to the appropriate flight control surface 15. Such control surface 15 comprises the tail rotor and swash plate whose motion, whether induced by pedals or actuator, produces appropriate changes in rotor blade pitch. Details of the mechanical linkage system are not shown but are found in the literature and are quite familiar to those skilled in the art.

As further represented in FIG. 1, a servosystem 17 receives a drive signal $S_3$, which is dependent upon autopilot command signal $S_1$, and in accordance with signal $S_3$, servosystem 17 drives the linkage system 13 which in turn controls the swash plate position and thus the tail rotor blade pitch. Using the vernacular of the art, servosystem 17 is connected to operate in parallel with linkage system 13.

Signal $S_2$ from simulator 19 is essentially zero during normal automatically controlled flight and, as will become clearer herebelow, becomes non-zero when the pilot takes over control by applying a sufficient force to pedals 11.

More particularly now, command signal $S_1$ from an autopilot enters signal combining means 21 along with the simulator 19 output signal $S_2$. In the FIG. 1 embodiment, combiner 21 is a summer 23 having non-inverting inputs and produces output signal $S_3 = (S_2 + S_1)$.

Servosystem 17 comprises (i) an error producing circuit comprising summer 31 and power amp 33, (ii) an error magnitude sensing circuit 35, (iii) an error driven servomotor 37, and (iv) feedback circuit 39 which provides a feedback signal dependent upon both the servomotor output and an output of an error sensing circuit 35.

Summer 31 outputs the difference between $S_3$ and the feedback from circuit 39. This difference or error is amplified in amplifier 33 and the amplifier 33 output is fed to sensing circuit 35 and then on to servomotor 37. The output shaft of servomotor 37 provides input to circuit 39 which comprises a tachometer 41, a washout circuit 43, and a summer 45. Tachometer 41 outputs a signal representative of servomotor output rate and this tachometer output signal is fed to both summer 45 and to washout circuit 43. The output of circuit 43 is also fed to summer 45 for adding with the servomotor-rate-representative signal, and the summer 45 output signal is used as the feedback signal input to summer 31.

Washout circuit 43 comprises a low-pass filter 47 and also includes a summer 49 for summing $S_4$ and the tach output. Washout circuit 43 produces the well-known effect of approximating a time integrator over the short term but then permitting its output to return toward zero at some time after the input has ceased to change. That is, steady components are washed out and the integrator-approximator, i.e., the washout circuit, holds its output only for seconds (typically one to three seconds) after its input has ceased to change. In normal automatically controlled flight, signal $S_4$ from circuit 35 is zero and thus, under such circumstances, circuit 39 receives input only from the servomotor and provides a rather conventional feedback signal to summer 31, namely, a rate damped, washout position feedback signal.

Sensing circuit 35 includes a resistor 51 through which the output of amplifier 33 passes. The amplitude of the voltage signal $S_R$ across resistor 51 is indicative of the amplitude of the corrective error signal produced by 31 and 33. Circuit 35 also includes (i) a low-pass filter 53 to which $S_R$ is fed for noise removal (ii) an amplitude limiter 55 to which filter output $S_{RF}$ is fed and (iii) a summer 57 having an inverting input to which $S_{RF}$ is also fed. The output $S_L$ of limiter 55 is fed to an inverting input of summer 57 so that the output $S_4$ of summer 57 is the excess of $S_{RF}$ over preferred reference $S_L$ (i.e., $S_4 = S_{RF} - S_L$) where $S_L = L_o \times S_{RF}$ for $-L_1 < S_{RF} < +L_2$, and $|S_L| < |L_o \times S_{RF}|$ for $S_{RF} < -L_1$, or $S_{RF} > +L_2$. In the preferred embodiment (i) $L_o$ is a constant and has a value of $+1$, (ii) $L_1$ and $L_2$ are also constants and have essentially the same value, hereinafter called L, and (iii) $S_L = +L$ for $S_{RF} > +L$, and $S_L = -L$ for $S_{RF} < -L$. Thus in the preferred embodiment, $S_4$ is essentially either zero or $\pm|S_{RF} - L|$ depending on the amplitude of $S_{RF}$ relative to the limit L of preferred limiter 55. More particularly, the output of limiter 55 is substantially the same as its input so long as the input amplitude is neither greater than $+L$ nor less than $-L$. Once the input amplitude exceeds the limiter limit, the limiter output becomes either $+L$ or $-L$ depending on the sign of the input. Thus, so long as the input to limiter 55 is within the bounds of $+L$ to $-L$, the output of summer 57 is zero, and whenever the input to limiter 55 falls outside the $-L$ to $+L$ range, the output of summer 57 is $\pm|S_{RF} - L|$. Limiter 55 also produces a logic type signal $S_5$ which changes state or otherwise indicates when $S_{RF}$ exceeds, either positively or negatively, the value L.

Circuit 35 output signal $S_4$ is fed to the summer 49 of the feedback circuit 39. Signal $S_4$ is connected to a non-inverting input of summer 49 whereas the tachometer 41 output is connected to an inverting input of summer 49. The tach 41 output signal, and signal $S_4$, thus evoke oppositely phased components of the feedback signal. More particularly, tach 41 induces a negative feedback component and signal $S_4$ induces a positive feedback component.

Signal $S_4$ is also fed to simulator 19 whose output $S_2$ is then fed to combining means 21. Simulator 19 comprises a variable gain circuit 61 and a low-pass filter 63. Variable gain circuit is an amplifier circuit whose gain is controlled by an input signal $S_v$ indicative of the aircraft airspeed. The gain is essentially constant for the lower airspeeds and then decreases as airspeed increases. Low-pass filter 63 effects approximately a one second delay between its input and output so as to simulate the inertia of the aircraft.

Signal $S_5$ controls a time delayed switch device which controls the delivery of signal $S_2$ to combining means 21. The switching device comprises a 0.27 second time delay circuit 71 and a switch 73 connected in series with and between items 61 and 63. Switch 73 remains open so long as $S_{RF}$ stays within the range of $-L$ to $+L$.

Low-pass filters 47, 53, and 63 are of conventional op-amp construction. The Laplace transforms for the filters 47, 53, and 63 transfer functions are, respectively, $(1/4s+1)$, $(1/0.25s+1)$, and $(1/1s+1)$.

Limiter 55 and variable gain circuit 61 are also of conventional construction and are well known to those skilled in the art. The value of L for limiter 55 is selected to correspond to the desired force or torque threshold. Circuit 61 is of a type often referred to in the art as a gain programmer. The gain versus airspeed characteristic is selected according to the particular aircraft. The gain versus airspeed characteristic for the presently preferred embodiment obeys the following expression:

gain=7, for airspeed between 0 and 20 knots;
gain=140/(airspeed in knots), for airspeed $\geq 20$ knots.

In normal automatic mode where the autopilot is flying the aircraft, $S_1$ may or may not be zero depending on whether a change of attitude or other parameter has been commanded by the autopilot. If $S_1$ is non-zero and there is no manual input on pedals 11, $S_2$ and $S_4$ under most normal conditions will both be zero. Under such assumption, neither simulator 19 nor the sensing circuit 35 impact the operation. That is, with $S_2$ and $S_4$ both zero, the input and feedback signals for servosystem 17 are the same as those in conventional systems, and thus the parallel servosystem 17 responds in a conventional manner to $S_1$ so as to move the linkages 13 and the control surface 15. When the aircraft responds, and has achieved the new attitude or other parameter, signal $S_1$ decreases to zero.

Assuming the condition where the pilot begins to apply and then increase the force on yaw control pedals 11, signal $S_R$ starts to increase in response to such manual force because servomotor 37 tries to resist and to do so requires greater input signal. At some predetermined force threshold corresponding to limiter value L, $S_4$, which is indicative of the excess of the servosystem 17 error signal over a predetermined reference, becomes non-zero, and $S_5$ changes logic state so as to activate the time delay switching device 71, 73. With $S_4$ non-zero, $S_2$ also becomes non-zero and approximates the changes in signal $S_1$ which arise due to the autopilot trying to do its job and maintain the previous attitude or parameter.

Signals $S_1$ and $S_2$ are combined in 21 in an opposing phase relationship so that $S_1$ and $S_2$ tend to cancel one another and result in $S_3$ being approximately zero. The purpose is to reduce $S_3$ sufficiently during this period of manual input so that the servosystem 17 does not fight or oppose the manual input from pedals 11.

Additionally, since non-zero $S_4$ reflects the rate at which the pilot applies the force, the differencing (i.e., the opposing phase combining) in 49 of $S_4$ and tach 41 output effects the provision of less net rate-representative feedback into 47 and thus effects the provision of reduced net position-representative feedback into 31. Depending on the rate of $S_4$, the effect of $S_4$ may go beyond reducing the effect of the tach output and totally counter the tach output or even surpass it so that the positive feedback component exceeds the negative feedback component, thereby making the resultant or net feedback positive. Whatever the degree of contribution, the effect of the $S_4$ contribution is to aid servomotor output movement in the direction of the applied force instead of opposing the applied force. Furthermore, by effecting a differencing of the washout of $S_4$ and the washout of tach 41 output, and employing the net in the development of the corrective error signal, the servomotor 37 output is caused to move at a rate substantially proportional to the pilots pedal force.

The purpose of time delay 71 and switch 73 is to prevent nuisance aircraft responses should the pedals 11 be accidentally depressed.

To briefly sum up, whenever the pilot wishes to make a control input to change the aircraft heading or to modify the turn rate, he exerts a sufficient force on the yaw pedals in the direction of the desired aircraft response. The parallel servo circuitry senses the pilot force which exceeds the force required for automatic pedal movement, and generates two signals, namely, (i) a signal proportional to the pedal force in excess of a predetermined threshold or breakout servomotor torque, and (ii) a logic or switching signal which effects, when the breakout level is exceeded, the combination of a simulated command signal and the autopilot command signal. In addition, the circuitry in the parallel servosystem causes the servomotor to move at a rate proportional to the pilot's pedal force, using a "torque washout" whenever the sensed force exceeds the breakout force level. The resultant effect is the provision of a most natural pedal and aircraft response, there being substantially reduced or no tendency of the electronics to resist pilot control inputs. Electronically sensing the pilot force by means within the parallel servosystem is made possible because the servomotor drive current varies with and is a function of the pilot force.

Figure 2:
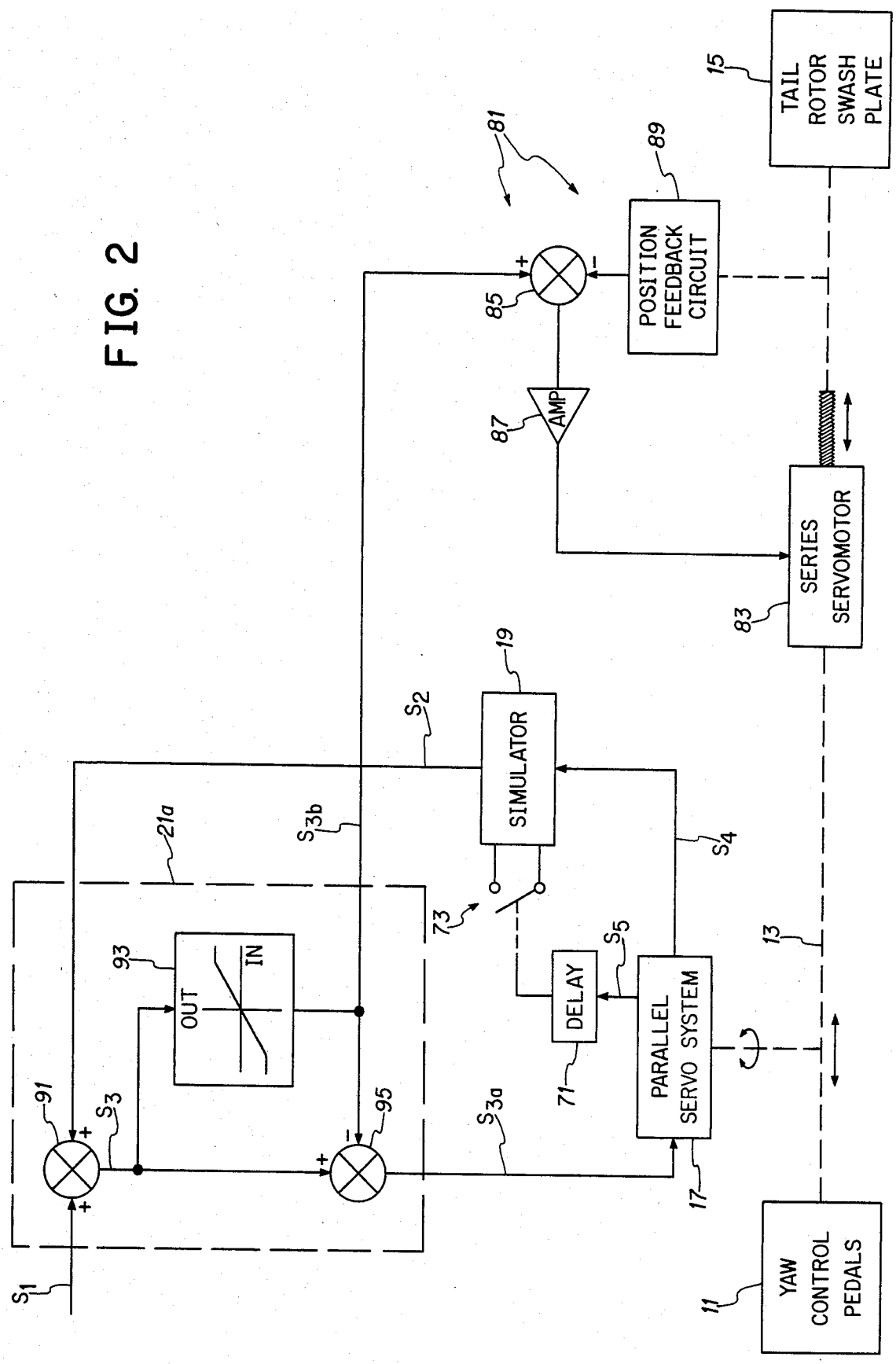
FIG. 2 is a block diagram schematic representing another presently preferred inventive embodiment.

Turning now to FIG. 2, the embodiment therein represented is in many respects like the embodiment represented in FIG. 1. Where appropriate, therefore, like designators will be used for like elements. The primary differences between the two embodiments are (i) the FIG. 2 embodiment further includes a conventional series servosystem 81 and (ii) FIG. 2 combining means 21a is different from the FIG. 1 combining means 21.

More particularly, a conventional series servosystem 81 is connected to linkages 13 so as to operate in series therewith. The series servosystem 81 comprises a screw type servomotor 83 connected in series with the linkages 13, a summer 85 and amplifier 87 for receiving input and feedback signals and producing a corrective error signal therefrom, and a feedback circuit 89, including a position transducer, for providing position feedback to summer 85. The case or housing of motor 83 moves with linkages 13 whereas the case or housing of motor 37 is stationary relative to linkages 13.

Combining means 21a comprises a summer 91 for receiving and differencing signals $S_2$ and $S_1$ so as to produce signal $S_3$, and further comprises circuitry for directing part of $S_3$ to series servosystem 81 and an excess part of $S_3$ to parallel servosystem 17. More particularly, combining means 21a further comprises an amplitude limiter 93 and another summer 95. Signal $S_3$ is connected to the input of limiter 93 and to a non-inverting input of summer 95. The output of limiter 93, namely signal $S_{3b}$, is input to an inverting input of summer 95 and is also input to series servosystem 81. The output of summer 95, namely, signal $S_{3a}=S_3-S_{3b}$, is input to parallel servosystem 17 whereas in the FIG. 1 embodiment signal $S_3$ is input to servosystem 17. Preferred amplitude limiter 93 is similar to the preferred limiter 55 in FIG. 1, preferred limiter 93 having limits of $\pm b$ where b is a constant whose value is selected in accordance with the degree of authority which the series servosystem 81 is permitted to have. When the input $S_3$ to limiter 93 is within the $-b$ to $+b$ range, $S_{3b}$ is substantially equal to $S_3$, and $S_{3a}$ is substantially equal to zero. When $S_3$ is outside the $-b$ to $+b$ range, $S_{3b}$ is substantially equal to the value b with appropriate sign, and $S_{3a}$ is substantially equal to $(S_3-S_{3b})$. When $S_{3b}$ is non-zero and $S_{3a}$ is zero, only the series servosystem 81 effects control surface movement in the short term. When excess-representative signal $S_{3a}$ is non-zero, the parallel servosystem 17 also comes into play in the short term, also moving the swash plate 15 and operating like the FIG. 1 embodiment shown and described hereinabove.

Figure 3:
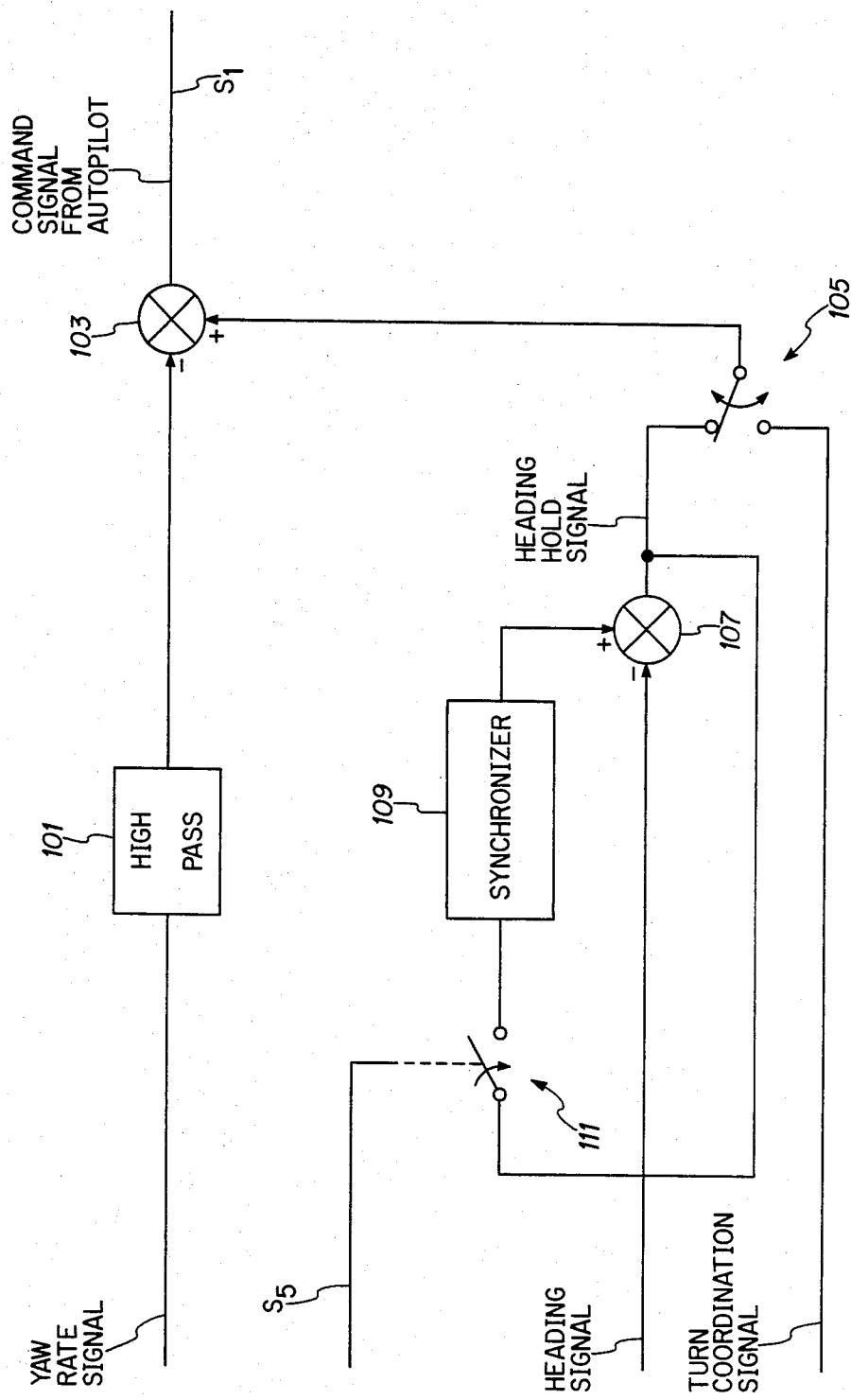
FIG. 3 is a block diagram schematic representing a part of an autopilot for generating inputs to the embodiments represented in FIGS. 1 and 2.

Turning now to FIG. 3, therein is represented part of an autopilot which generates the signal $S_1$ for the FIGS. 1 and 2 embodiments. More particularly, a yaw rate signal is fed to a high-pass filter 101 whose output is then fed to the inverting input of a summer 103. A selected one of two other signals, as selected by switch 105, is fed to the non-inverting input of summer 103. These two signal selections are a heading hold signal and a turn coordination signal. The heading hold signal is the output of a summer 107 whose non-inverting input and inverting input receive, respectively, (i) the output of a synchronizer 109 and (ii) a heading signal. The input to synchronizer 109 is controlled by switch 111 which is opened and closed by signal $S_5$, switch 111 being closed by $S_{RF}$ exceeding a limit of limiter 55. Synchronizer 109 comprises a conventional integrator and, when switch 111 is closed, receives the output of summer 107 and serves to synchronize the heading hold reference to the newly existing aircraft heading which results from the pilot's excess manual force on the pedals 11. Signal $S_1$ is the output of summer 103. High-pass filter 101 is of conventional construction and serves to eliminate any steady state component which the yaw rate signal might have. The Laplace transform of the transfer function of high pass filter 101 is $(7s/7s+1)$.

The above-described control systems and control principles may also be applied to the roll, pitch, and/or collective control systems of a helicopter. Also, same may be used in the corresponding controls of other type aircraft such as those of the vectored thrust type. Thus, while various embodiments have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. For use in an aircraft having an autopilot for providing one or more flight command signals and further having a manually operable device mechanically coupled through appropriate linkages to a flight control surface so as to afford positioning of said surface, the apparatus comprising:
    (i) signal combining first means for receiving a command signal $S_{at}$ from the autopilot, and (b) a signal $S_m$, and for combining $S_m$ and $S_{at}$ in a predetermined phase relationship,
    (ii) second means connected for receiving a control signal $S_{cp}$ from said first means and comprising:
        (a) servomotor means connected to said linkages so as to operate in parallel with said manually operable device;
        (b) means for receiving $S_{cp}$ and a feedback signal and producing therefrom a corrective error signal $S_{ep}$ for causing the servomotor output position to change;
        (c) sensing means comprising circuit means, responsive to $S_{ep}$, for providing a signal $S_x$ indicative of the excess of $S_{ep}$ over a predetermined reference $R_1$, said excess being caused by a sufficient manual force being applied through said manually operable device and through said linkages to said flight control surface,
        (d) feedback circuit means for receiving the parallel servomotor output and signal $S_x$ and in response thereto producing said feedback signal, said feedback circuit means responding to signal $S_x$ and to the parallel servomotor output such that $S_x$ and the parallel servomotor output evoke oppositely phased components of said feedback signal; and
    (iii) third means, responsive to $S_x$, for producing a signal simulative of the changes in the autopilot command signal $S_{at}$ which result from the aircraft responding to the manual force, the change-simulative signal provided by said third means being the signal $S_m$,
    and said predetermined phase relationship in which $S_m$ and $S_{at}$ are combined by said first means being a phase relationship such that $S_m$ and said changes in $S_{at}$ tend to cancel one another.

2. Apparatus as defined in claim 1 wherein said sensing means further provides a signal $S_{td}$ for indicating whether $S_{ep}$ has exceeded the predetermined reference $R_1$, and the apparatus further includes switching means responsive to $S_{td}$ for controlling the delivery $S_m$ to said first means.

3. Apparatus as defined in claim 2 wherein said switching means comprises time delayed switching means.

4. Apparatus as defined in claim 1 wherein said first means comprises means for producing $S_{cp}$ such that $S_{cp}$ is indicative of the difference between $S_{at}$ and $S_m$.

5. Apparatus as defined in claim 1 and further including a series servosystem fourth means connected for receiving a control signal $S_{cs}$ from said first means and comprising:
- (a) servomotor means connected to said linkages so as to operate in series with said manually operable device;
- (b) means for receiving input and feedback signals and producing therefrom a corrective error signal $S_{es}$ for causing said series servomotor output position to change;
- (c) feedback circuit means connected to the series servomotor output for providing said feedback to the means producing $S_{es}$.

6. Apparatus as defined in claim 5 wherein said first means comprises means for producing $S_{cs}$ and $S_{cp}$ such that $S_{cs}$ is indicative of the output of an amplitude limiter whose input is the difference $S_D$ between $S_{at}$ and $S_m$, and such that $S_{cp}$ is indicative of the excess of $S_D$ over a predetermined reference $R_2$.

7. Apparatus as defined in claim 6 wherein $R_2$ is $S_{cs}$.

8. Apparatus as defined in claim 1 wherein the feedback circuit means of the second means includes a washout circuit having input connected for receiving $S_x$ and having output connected for contributing to net feedback signal.

9. Apparatus as defined in claim 1 wherein said third means comprises a variable gain circuit and a low-pass filter connected in cascade, said variable gain circuit comprising means for providing gain which varies as a function of a predetermined flight parameter.

10. Apparatus as defined in claim 9 wherein the filter characteristic of said low-pass filter is suitable to simulate the inertia of the aircraft.

11. Apparatus as defined in claim 9 wherein said predetermined flight parameter is airspeed.

12. Apparatus as defined in claim 11 wherein, over at least part of the gain range, the gain decreases as airspeed increases.

13. Apparatus as defined in claim 1 wherein said sensing means further provides a signal $S_{td}$ for indicating whether $S_{ep}$ has exceeded the predetermined reference $R_1$, and wherein there is further included switched synchronizer means responsive to $S_{td}$ for synchronizing an autopilot generated heading hold signal in accordance with new aircraft heading resulting from the manual force.

14. Apparatus as defined in claim 1 wherein said predetermined reference $R_1$ comprises a signal $S_{01}$ indicative of the output of an amplitude limiter whose input is $S_{ep}$.

15. Apparatus as defined in claim 14 wherein said sensing means includes amplitude limiter means for providing the output signal $S_{01}$ in response to input signal $S_{ep}$ according to the following:

$S_{01}$ is substantially equal to $S_{ep}$ when $-K_1 < S_{ep} < +K_2$;

$S_{01}$ is substantially equal to $(-K_1)$ when $(-K_1) > S_{ep}$;

and $S_{01}$ is substantially equal to $(+K_2)$ when $(+K_2) < S_{ep}$; where $K_1$ and $K_2$ are predetermined constants.

16. Apparatus as defined in claim 15 wherein $K_1 = K_2$.

17. Apparatus as defined in claim 16 wherein the feedback circuit means of the second means includes a washout circuit having input connected for receiving $S_x$ and having output connected for contributing to net feedback signal.

18. Apparatus as defined in claim 16 or 17 wherein said third means comprises a variable gain circuit and a low-pass filter connected in cascade, said variable gain circuit comprising means for providing gain which varies as a function of a predetermined flight parameter.

19. Apparatus as defined in claim 18 wherein the filter characteristic of said low-pass filter is suitable to simulate the inertia of the aircraft.

20. Apparatus as defined in claim 19 wherein said predetermined flight parameter is airspeed.

* * * * *